United States Patent
Alnoor

(10) Patent No.: US 9,110,844 B2
(45) Date of Patent: Aug. 18, 2015

(54) STATE MAINTENANCE AS A SERVICE

(75) Inventor: Ahmadullah Alnoor, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/594,886

(22) Filed: Aug. 27, 2012

(65) Prior Publication Data

US 2014/0059209 A1 Feb. 27, 2014

(51) Int. Cl.
*G06F 15/16* (2006.01)
*G06F 11/14* (2006.01)
*G06F 9/54* (2006.01)

(52) U.S. Cl.
CPC .............. *G06F 11/1438* (2013.01); *G06F 9/54* (2013.01); *G06F 11/1479* (2013.01); *G06F 2201/815* (2013.01); *G06F 2209/541* (2013.01)

(58) Field of Classification Search
USPC .................. 709/224, 228, 227, 219; 370/229; 711/163
See application file for complete search history.

(56) References Cited

U.S. PATENT DOCUMENTS

| | | | | |
|---|---|---|---|---|
| 7,254,634 | B1* | 8/2007 | Davis et al. ................... | 709/228 |
| 7,693,050 | B2* | 4/2010 | Achlioptas et al. ........... | 370/229 |
| 8,015,262 | B2* | 9/2011 | Brunswig et al. ............. | 709/219 |
| 8,161,163 | B2* | 4/2012 | Hunt .............................. | 709/227 |
| 2009/0216885 | A1* | 8/2009 | Brunswig et al. ............. | 709/227 |
| 2011/0022812 | A1* | 1/2011 | van der Linden et al. .... | 711/163 |
| 2011/0029882 | A1* | 2/2011 | Jaisinghani ................... | 715/736 |
| 2011/0098029 | A1 | 4/2011 | Rhoads et al. | |
| 2012/0072985 | A1 | 3/2012 | Davne et al. | |
| 2014/0059209 | A1* | 2/2014 | Alnoor .......................... | 709/224 |

OTHER PUBLICATIONS

Richards, Adam J. "Stateful Cloud", Retrieved at <<http://web.me.com/adamjmrichards/Stateful_Cloud/Stateful_Clouds.html>> Retrieved Date: Jun. 25, 2012, pp. 3.
Goscinski, et al., "Toward Higher Level Abstractions for Cloud Computing", Retrieved at <<http://inderscience.metapress.com/content/x658223g81087135/fulltext.pdf>> in the proceedings of Int. J. Cloud Computing, vol. 1, No. 1, Oct. 2011, pp. 37-57.
S. Hadjiefthymiades, et al. "State Management in WWW Database Applications", Proceedings of the 22nd International Computer Software and Applications Conference, COMPSAC '98, 1998, pp. 442-448.
Thomas Dreibholz, "An efficient approach for state sharing in server pools", In Proceedings of the 27th IEEE Local Computer Networks Conference, 2002, pp. 348-352.
Tim Landgrave, "Server-side state management for .net architects", dated Mar. 19, 2003. 3 pages.
Orion Letizi, "Stateful Web Applications that Scale like Stateless ones". Jun. 11, 2008. 4 pages.

(Continued)

*Primary Examiner* — Tammy Nguyen
(74) *Attorney, Agent, or Firm* — Damon Rieth; Jim Ross; Micky Minhas

(57) ABSTRACT

When a stateful service is implemented in a cloud architecture, a state service system receives a user interface definition for a service and generates a client proxy and optionally a storage proxy. The stateful service implements service instances to service requests from clients. The client proxy receives and logs messages from a client in a state service component and a storage proxy logs interactions with a data store. When a service instance serving existing clients is changed, the proxies replay the logged information to the new service instance to recover or maintain state for individual client sessions.

20 Claims, 13 Drawing Sheets

(56) References Cited

OTHER PUBLICATIONS

B.C. Ling et al. "A self-tuning, self-protecting, self-healing session state management layer", Automatic Computing Workshop Jun. 2003, 9 pages.
Xiang Song, et al. "State Mangement of Web Services" Dec. 8, 2003, 13 pages.
Yong Xie, et al. "Statement Management Issues and Grid Services", Grid and Cooperative Computing—GCC 2004. 8 pages.
Roger Barga, et al. "Persistent Client-Server Database Sessions", Advances in Database Technology—EDBT 2000, Springer Berlin/Heidelberg, 2000, pp. 462-477.
Roger Barga, et al. "Persistent Applications via Automatic Recovery", Database Engineering and Applications Symposium, International (2003), 10 pages.
Bogdan Solomon, et al. "Designing Automatic Management Systems for Cloud Computing", 2010 International Joint Conference on Computational Cybernetics and Technical Informatics (2010), 631-636.
Christos A. Yfoulis, et al. "Honoring SLAs on Cloud Computing Services: A Control Perspective", In European Control Conference, ECC09, 2009, 6 pages.
Tim Dornemann, et al. "On-Demand Resource Provioning for BPEL Workflows Using Amazon's Elastic Compute Cloud", Cluster Computing ona dthe Grid 2009. 8 pages.
Horacio Andres Lagar-Cavilla, et al. "SnowFlock: Rapid Virtual Machine Cloning for Cloud Computing". Proceedings of the 4th ACM European Conference on Computer Systems, EuroSys '09, 2009. pp. 1-12.
Ying Zhang, et al., "Integrading Resource Consumption and Allocation for Infrastructure Resources On-Demand", Cloud Computing (CLOUD), 2010 IEEE 3rd International Conference on 2010, pp. 75-82.
David Oppenheimer, et al. "Why Do Internet Services Fail, and What Can be Done About It?" Proceedings of the 4th Conference on USENIX Symposium on Internet Technologies and Systems—vol. 3 4, 2003, 15 pages.
Simon Guest. "Using Reflection Emit to Cache.NET Assemblies", http://msdn.microsoft.com/en-us/library/ms973916.aspx—accessed Aug. 22, 2012. 22 pages.

* cited by examiner

STATE MAINTENANCE AS A SERVICE

BACKGROUND

Some current cloud computing environments provide an architecture in which infrastructure, platforms, and software are provided as services. In this context, infrastructure often refers to computing, communication and storage resources. The term platform includes enabling resources, that themselves include operating systems and application development as well as deployment services. Software as a service extends service oriented architectures from fine grained operations to richer applications. In general, one common trait among cloud layers is that they provide utility computing. That is, resources are made available and scaled on demand, allowing a pay-per-use billing model.

One mechanism that many cloud computing architectures use to employ scalability enables scaling out, whereby multiple instances of a service, each running on its own virtual machine, process client requests. In some particular connectionless scenarios, affinity between a specific client and a specific server instance for the duration of the session (referred to as session affinity) is not guaranteed.

One reason that the cloud computing architecture does not always guarantee session affinity (such as in connectionless scenarios) is that it can generate new service instances, when required to service a given workload in a load balanced fashion. It can also remove service instances when the number of service instances can be reduced given the current workload. Therefore, when the client is interacting with one service instance, and it is taken away and the client requests are forwarded to another service instance, the new service instance has no idea of the session state. A similar problem surfaces when requests from a given client are spread across multiple servers for the purpose of load balancing.

This lack of session affinity and session migration can present a problem in attempting to deploy certain applications or services to a cloud environment. In particular, where a hosted application or service is a stateful service, lack of session affinity can be problematic. By way of one specific example, assume that a client is interacting with a flight reservation service, in order to book a flight reservation on an airline. This particular task requires several interactions between the client and the service. Those tasks might include identifying a destination city, an origination city, an airline, a flight time, etc. In this type of stateful application, either the client application on the client's machine, or the service instance which the client is interacting with, must remember who the client is, the state of the application and the state of the session. Application state refers to data maintained by the application for the application. Some such data includes configuration settings, policies, etc. Application state is normally disassociated from all entities, and has a lone binding to the application itself and is thus maintained on the server side. Session state is the state of a particular client/server interaction (or session). Session state can refer to the state of the service (i.e., the state of server objects) and/or the state of the client (i.e., the state of client objects). Session state can be persisted as current values or as a history of modifications to relevant objects. In any case, the session state can be stored either at the client, at the server that is providing the service, or distributed among the two.

Because the cloud computing architecture does not ensure session affinity and/or session migration of a given session between a client and a given service instance, it can be difficult to migrate stateful applications to a cloud computing architecture. Some have attempted to address this problem by substantially rewriting applications or services to make them stateless. That is, the applications or services are rewritten so that the clients maintain state so the server instance need not maintain state. However, this often requires a great deal of development and time, and is inefficient and error prone.

The discussion above is merely provided for general background information and is not intended to be used as an aid in determining the scope of the claimed subject matter.

SUMMARY

When a stateful service is implemented in a cloud architecture, a state service system receives a service interface definition for the stateful service and generates a client proxy and an optional storage proxy. The stateful service implements service instances to service requests from clients. The client proxy receives and logs messages from a client in a state service component and a storage proxy logs service interactions with a data store in the state service component as well. When the service instance associated with an existing client changes, the proxies replay the logged information to the new service instance to recover or maintain state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
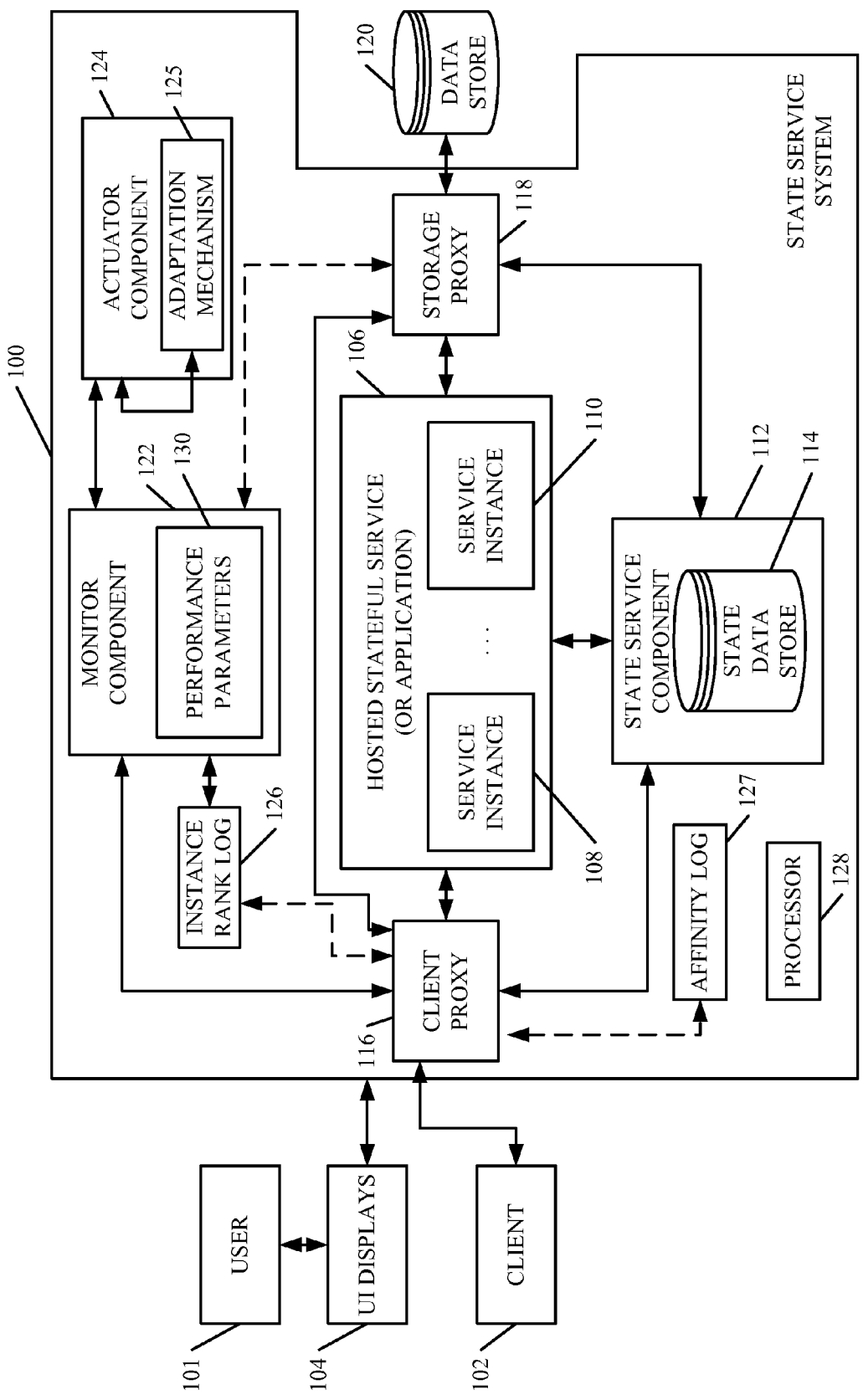
FIG. 1 is a block diagram of one embodiment of a state service system.

FIG. 1 shows one illustrative block diagram of state service system 100. System 100 is shown being accessed by client 102. FIG. 1 also shows that system 100 can be accessed by user 101 (which can be an administrator or manager or other user) through user interface displays 104. Service system 100 illustratively includes hosted stateful service (or application)

106 which, itself, implements one or more service instances 108 and 110. System 100 also includes state service component 112 that includes a state data store 114. In addition, system 100 includes client proxy 116, storage proxy 118, monitor component 122, actuator component 124, adaptation mechanism 125, instance rank log 126, affinity log 127, and processor 128. FIG. 1 also shows system 100 accessing data store 120 that stateful service 106 interacts with. It will be noted, however, that system 100 can host stateful services that do not access data stores as well.

Processor 128 is illustratively a computer processor with associated memory and timing circuitry (not shown). Processor 128 illustratively performs a functional part of system 100 and is activated by, and facilitates the functionality of, other components and proxies of system 100. In addition, there can be multiple processors 128 in the various components of system 100, or a single processor as shown. Only one processor 128 is shown for system 100 for the sake of simplicity.

In one embodiment, system 100 is implemented in a cloud architecture (which is described in greater detail below with respect to FIG. 7). In system 100, hosted stateful service 106 is illustratively accessed by client 102 and state service system 100 provides state service component 112 to maintain the session state of various sessions conducted through various service instances 108-110 for different clients (including client 102). In doing so, system 100 facilities the function of client proxy 116 and storage proxy 118. The detailed operation of system 100 is described in greater detail below. However, for the sake of better understanding, a brief overview will now be provided.

The client or administrator, who wishes to migrate stateful service 106 to system 100, first provides a service interface definition of stateful service 106 to system 100. Based on that definition, system 100 generates client proxy 116 that intercepts messages from client 102 to service 106 and logs them using state service component 112. During operation of service 106, storage proxy 118 illustratively logs data access operations that are performed against data store 120. This is also illustratively logged using state service component 112. Then, if a particular service instance (such as service instance 108) that client 102 is using becomes unavailable (such as if it either fails or is de-allocated) client proxy 116 and storage proxy 118 replay the stored/logged session messages to a new service instance (such as service instance 110) that client 102 will next interact with. This enables the new service instance 110 to know the state that the old service instance 108 was in before it failed (or before it was shutdown).

In addition, the client or administrator can provide monitor component 122 with performance parameters 130 that indicate how the client or administrator wishes to meet the needs of various clients who will be accessing the hosted stateful service 106. These needs can be described in a service level agreement in terms of Service Level Objectives, by way of example. The performance parameters are monitored by monitor component 122 and the parameter levels, or a forecast based on the parameter levels, is reported to actuator component 124 which decides upon allocating new service instances, and in de-allocating (or retiring) service instances based on load and other features, for example. That is, when monitor component 122 compares the performance of service 106 against the performance parameters 130, and determines that a new service instance likely needs to be generated in the future, monitor component 122 sends a signal to actuator component 124 notifying of the extent of change in the performance so the actuator component 124 may invoke adaptation mechanism 125 to generate a new service instance when appropriate. In addition, when monitor component 122 compares the performance of service 106 against performance parameters 130 and determines that one of the service instances can likely be shutdown (or retired), monitor component 122 provides a signal to actuator component 124 informing actuator 124 of the degree of change in performance prompting the actuator component 124 to invoke adaptation mechanism 125 to shutdown a service instance when feasible. Client 102 is illustratively a user agent (or program), such as a browser, a mobile phone application, or any other application or program that sends messages to hosted stateful service 106. Client 102 is on a client device which can be any of a wide variety of different devices, such as a cell phone, smart phone, laptop computer, tablet computer, desktop computer, other mobile device etc.

When a particular client session (such as the session with client 102) is being migrated from one instance to another as a result of the monitor component 122 having detected the failure of the associated service instance, monitor component 122 provides a signal to client proxy 116 and optionally to the storage proxy 118 to initiate a session state recovery process on the new instance. When the recovery process is complete, the new instance knows the state that the old instance was in before the session for client 102 was migrated to the new instance.

Figure 2:
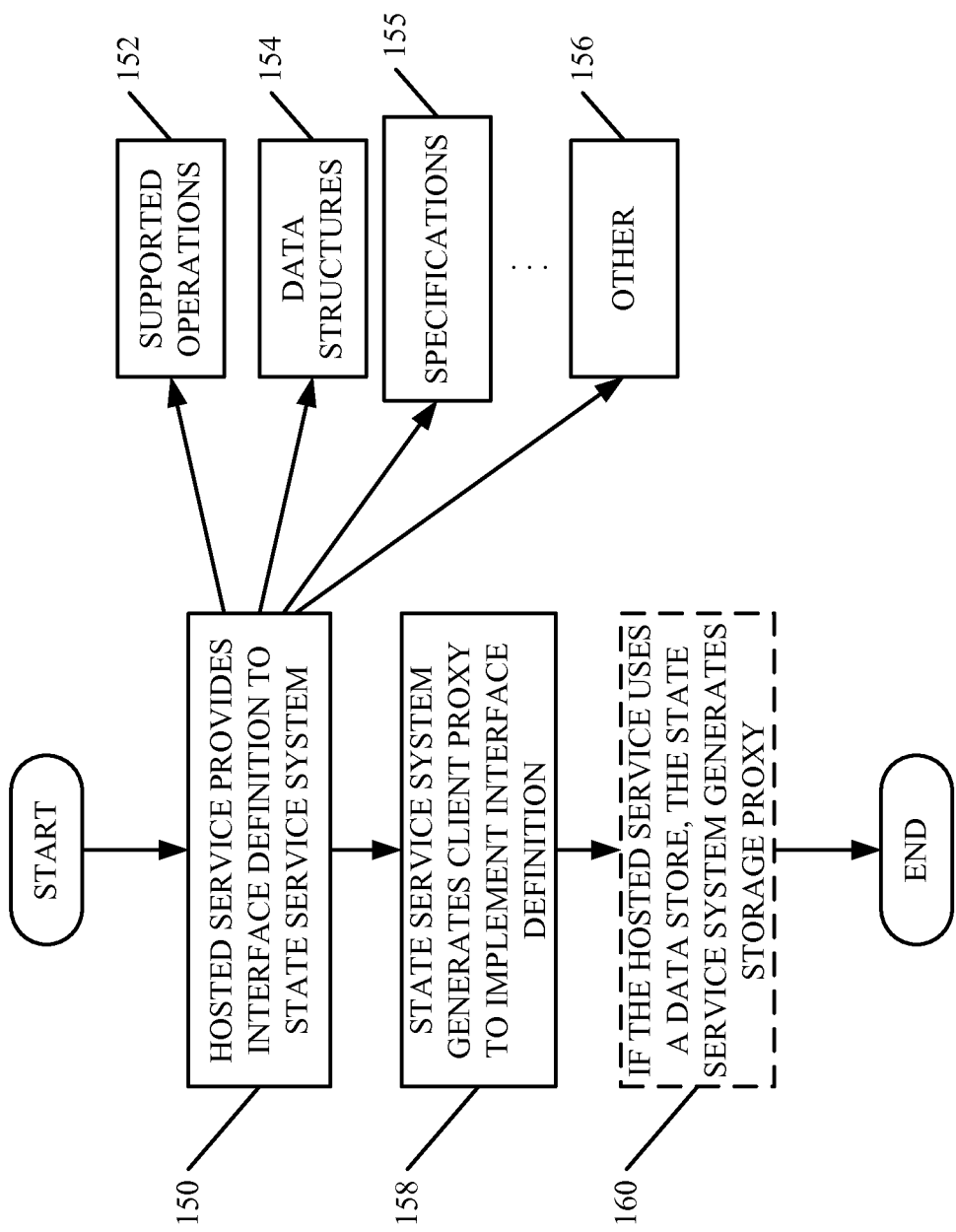
FIG. 2 is a flow diagram illustrating one embodiment of the operation of the system shown in FIG. 1 in generating proxies.

FIG. 2 is a flow diagram illustrating one embodiment of the operation of the system shown in FIG. 1 in generating client proxy 116 and storage proxy 118. In one embodiment, in order to deploy hosted stateful service 106 in a cloud architecture in state service system 100, the service, through an administrator, accesses system 100. System 100 displays a suitable user interface display 104 for the administrator. The administrator of the service to be hosted provides an interface definition, that is to be used by the client in accessing the hosted service, to state service system 100. In one embodiment, the interface definition includes the supported operations, the supported data structures, and other items used to define the interface. Providing the interface definition to state service system 100 is indicated by block 150 in FIG. 2. The supported operations are indicated by block 152. The supported data structures are indicated by block 154. In addition, specifications 155 of the mechanism used to access the data store 120, if any, are also provided to aid with the generation of the storage proxy 118. Other information used to define the interface is indicated by block 156.

In response to receiving the interface definition, state service system 100 generates client proxy 116 to implement the interface according to that interface definition. This is indicated by block 158 in FIG. 2. During operation, and as discussed in greater detail below, client proxy 116 also performs steps, such as logging messages from client 102 to state service component 112.

State service system 100 also optionally generates storage proxy 118. This is indicated by dashed block 160 in FIG. 2. Storage proxy 118 logs, with state service component 112, a history of interactions between an instance of stateful service 106 and data store 120. Therefore, storage proxy 118 is only needed if the stateful service 106 interacts with a data store 120.

Figure 3:
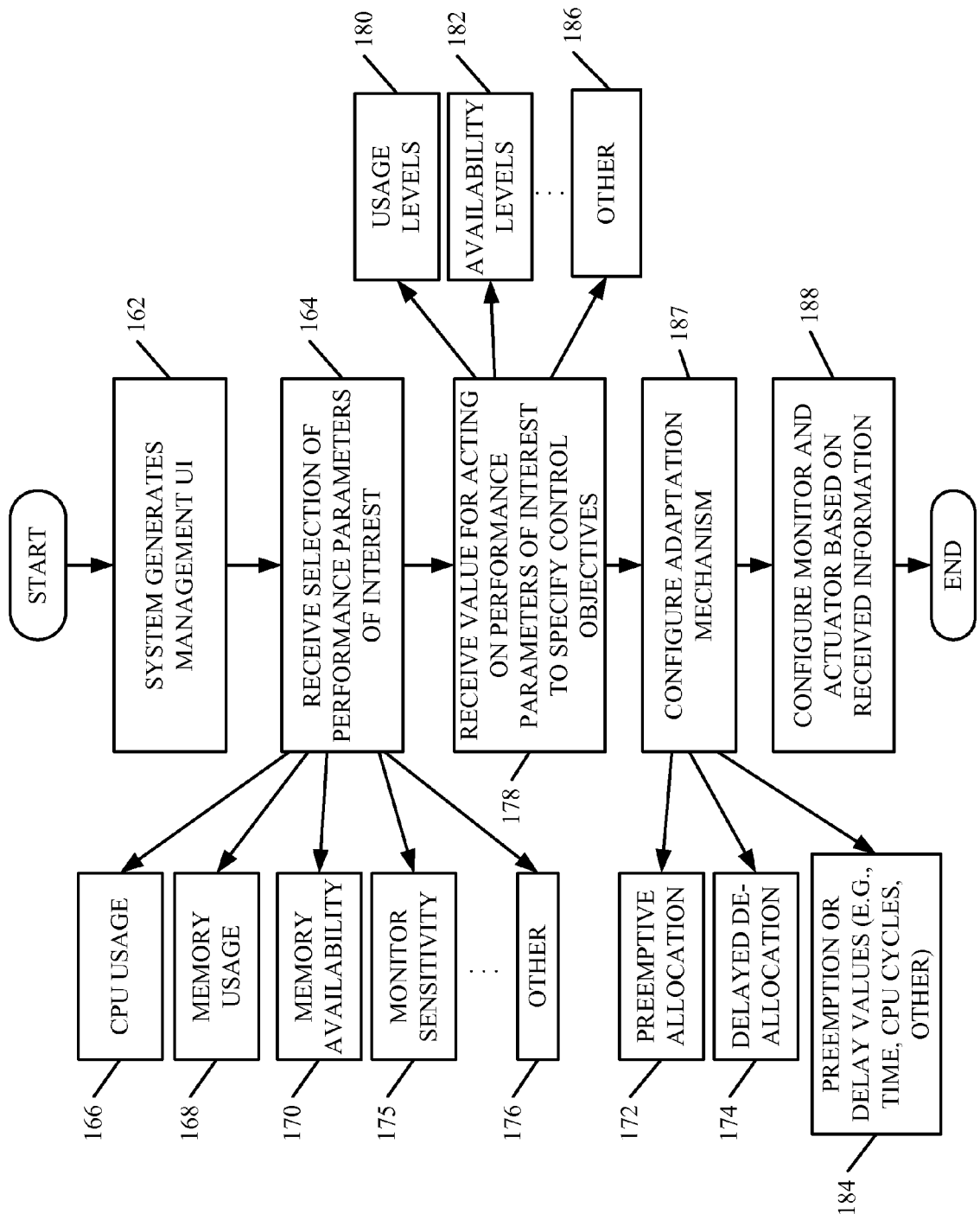
FIG. 3 is a flow diagram illustrating one embodiment of the operation of the system shown in FIG. 1 in configuring a monitor and actuator with performance parameters and Service Level Objectives.

FIG. 3 is a flow diagram illustrating one embodiment of the operation of system 100 in configuring monitor component 122 with performance parameters 130 and also configuring the actuator component 124 with a resource allocation and de-allocation (elasticity) policy. In one embodiment, system 100 first generates a management user interface display to a manager that is setting up performance parameters 130 for service 106. This is indicated by block 162 in FIG. 3. This can also be done by system 100 exposing an application programming interface (API) that allows the manager or administrator to access system 100 to configure or change its performance. For instance, the manager may, through the API, be allowed to change monitor sensitivity, selection of performance parameters, control objectives, characteristics of adaptation mechanism 125, etc. Some of these are discussed below. In the embodiment shown in FIG. 1, the user interface displays are represented at 104, and the manager setting up the performance parameters 130 for service 106 can be an administrator or another management entity and is shown in FIG. 1 as user 101.

Monitor component 122 then receives selection (or other identification) of a plurality of different performance parameters of interest from the manager setting up service 106. This is indicated by block 164 in FIG. 3. For instance, the manager may set up monitor component 122 to monitor CPU usage and send notification/signals to the actuator component 124 when the CPU usage increases or decreases. The actuator component 124 may then calculate whether a new service instance is needed or whether one can be shut down, and invokes adaptation mechanism 125 to generate new service instances of service 106 or shut down service instances of service 106 based on the CPU usage. Receiving CPU usage as a performance parameter 130 is indicated by block 166 in FIG. 3.

Monitor component 122 may also receive memory usage or memory availability (168 and 170, respectively), as performance parameters 130. That is, monitor component 122 can report to actuator component 124 memory usage or availability (or forecasted memory usage or availability) that can be used by actuator component 124 to generate new service instances or de-allocate (or retire) service instances based upon the memory usage 168 or memory availability 170 as described in the previous paragraph.

Another parameter that can be set is monitor sensitivity 175. That is, monitor component 122 illustratively intermittently (or periodically) monitors or measures the various parameters 130 and reports their values or changes relative to target or threshold values or forecasts based on the values. If the period between measurements is set to be longer, then monitor component 122 (and the system as a whole) is less sensitive to changes in the performance parameters. If the period is set to be shorter, then monitor component 122 (and the system as a whole) is more sensitive to those changes. This parameter (the time between measurements of the performance parameters) can illustratively be set as well.

Other performance parameters can also be used. This is indicated by block 176 in FIG. 3.

Once the manager has selected or otherwise identified which performance parameter 130 are desired for consideration in service 106, the manger or administrator can then provide values for those performance parameters 130 to specify control objectives. For instance, if the manager indicates that CPU usage 166 is a performance parameter that should be considered by monitor component 122, then the manager can specify a usage level for CPU usage as a threshold upon which actuator component 124 can take action (such as invoke adaptation mechanism 125 to create a new service instance or retire a service instance, etc.). Receiving values for acting on performance parameters of interest is indicate by block 178 in FIG. 3.

By way of example, the manager or administrator can set usage levels for CPU usage parameter 166 and memory usage parameter 168. This is indicated by block 180 in FIG. 3. The manager or administrator can also set availability levels for memory availability parameter 170. This is indicated by block 182. The administrator or manager can set other values as well, and this is indicated by block 186.

System 100 then configures actuator component 124 and adaptation mechanism 125 and finally monitor component 122 based upon the received performance parameters, and their corresponding values. This is indicated by blocks 187 and 188 in FIG. 3. This can be done in a wide variety of different ways. When configuring adaptation mechanism 125, the manager can set preempted allocation and/or delayed de-allocation (172 and 174, respectively) as characteristics of the adaptation mechanism 125 of resource allocation and de allocation. These characteristics can be used so that actuator component 124 allocates or de-allocates service instances in a timely manner. For instance, if monitor component 122 detects change in any of the performance parameters 130, monitor component 122 can send a signal to actuator component 124. If pre-emptive allocation is used then the actuator component 124 will attempt to invoke adaptation mechanism 125 to create a new instance before all the associated performance parameters have changed. By way of example, even if only the CPU usage increases to levels that warrant a new instance even though memory usage might still be acceptable, a new instance will be created nonetheless. If pre-emptive allocation is not used then new instances are created only when all (or some subset of) associated performance parameters 130 have reached threshold levels. Since, actuator component 124 cannot create a new service instance instantaneously. It may happen that before actuator component 124 and adaptation mechanism 125 create a new service instance, monitor component 122 sends another signal to actuator component 124 requesting a parameter value that would indicate that another service instance should be created. However, the actuator component 124 will check to determine when monitor 122 last requested actuator component 124 to create a new service instance. If the last request was within a threshold time period (e.g., a deferment indicator) specifying the minimum allocation time window required to create a new instance, actuator component 124 will not create a new service instance. This helps actuator component 124 to avoid creating additional service instances that are not really needed.

By way of example, the allocation time window can be set in terms of CPU cycles, time, etc. If monitor component 122 reports a value to actuator component 124 indicating that actuator 124 should create a new service instance within a certain number of CPU cycles or time, actuator component 124 can ignore the second report, because it assumes that the service instance that is currently being created will help to eliminate the need for yet another service instance.

The same is true for delayed de-allocation 174 of service instances. In one embodiment, actuator component 124 keeps track of when it created the last service instance, and it does not de-allocate a service too quickly thereafter. By way of example, if actuator component 124 just created the last new service instance within the last say five minutes, and monitor component 122 is now asking actuator component 124 to de-allocate one of the service instances, actuator component 124 can delay de-allocation (or retirement) of that service instance and can wait a specified amount of time (such as an hour or another amount of time) between creating (or allocating) a service instance and de-allocating that service instance. This can be done if the delayed de-allocation policy (or characteristic) 174 is set as a characteristic of the adaptation mechanism 125. Of course, other ways of preempting resource allocation and delaying resource de-allocation (or retirement) can be used as well. This builds a certain type of hysteresis into the system so that the system is not over-sensitive to performance parameters 130. Setting the preemption or delay threshold (in terms of CPU cycles, time or other values) where preemptive allocation and delayed de-allocation are used is indicated by block 184 in FIG. 3.

In accordance with one embodiment, monitor component 122 sets up a table "Performance Counters" with the structure indicated below in Table 1.

TABLE 1

Performance Counters: {Component; Instance; CounterType; CurrentValue; OldValue}

This table records the performance counters of interest for instances of service 106 and optionally proxy components 116 and 118. As shown in Table 1, the table stores the current value, as well as the previous value, for each performance counter. It identifies the particular component, the instance, and the counter type corresponding to those values. The monitor component 122 intermittently (e.g., periodically) assigns a load-based ranking of all instances, and that ranking can be written to the instance rank log 126. One embodiment for actually calculating the rank is described below with respect to FIG. 4.

Figure 3A:
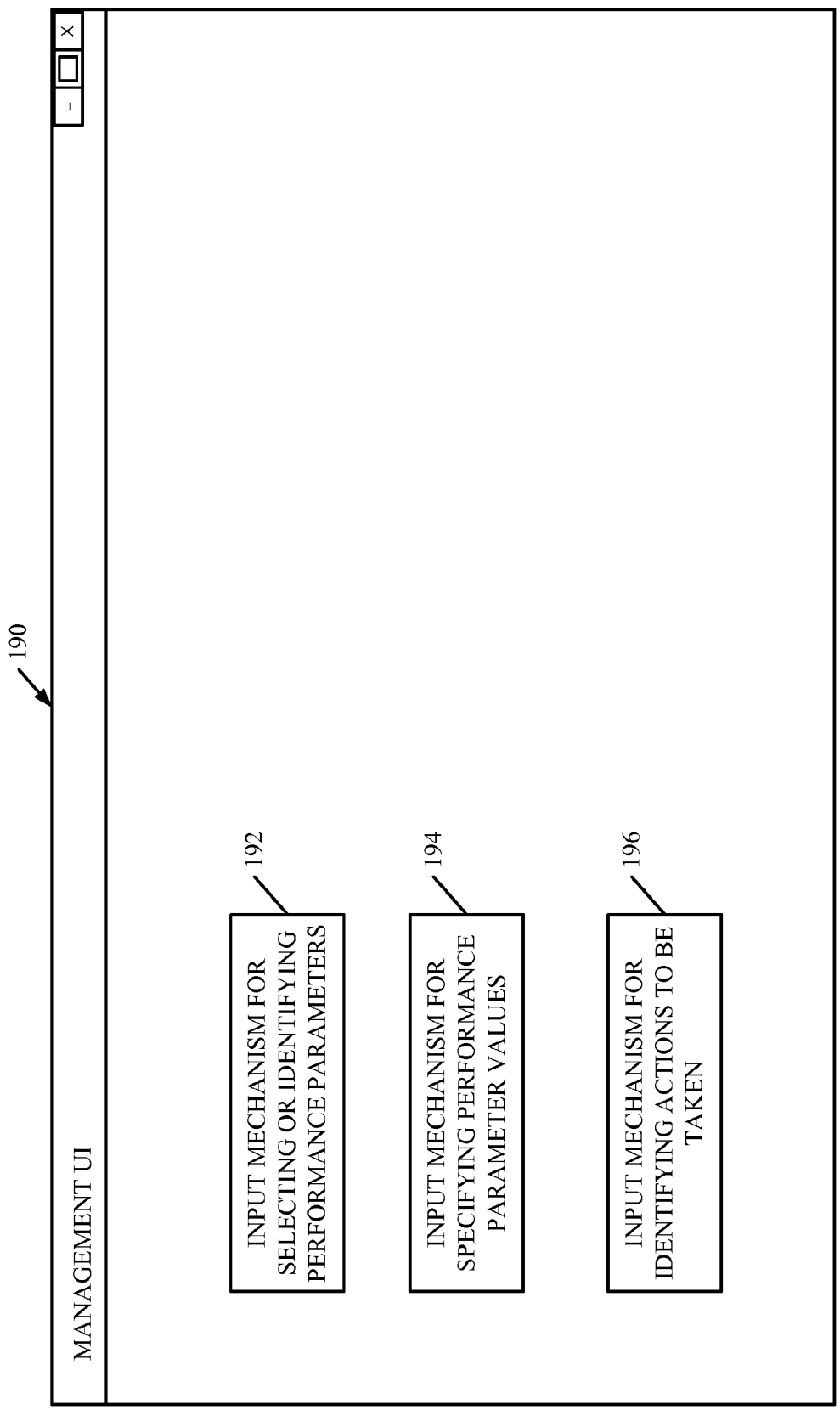
FIG. 3A is one exemplary user interface display.

FIG. 3A shows one illustrative management user interface display 190. User interface display 190 illustratively includes user input mechanisms for selecting or identifying performance parameters of interest 130 that are to be used with the given hosted service 106. These input mechanisms are indicated by block 192 in FIG. 3A. The user interface display 190 also illustratively includes user input mechanisms for specifying performance parameter values. This is indicated by block 194 in FIG. 3A. Display 190 also illustratively includes user input mechanisms for identifying actions to be taken based on the performance parameters and their values. This is indicated by block 196 in FIG. 3A. Of course, it will be noted that while user interface display 190 includes user input mechanisms 192, 194 and 196 all on a single display, they could be broken into separate user interface displays as well.

In addition, each of the user input mechanisms can illustratively be a wide variety of user input mechanisms, such as text boxes, check boxes, dropdown menus, etc. In addition, the user input mechanisms can be actuated in a wide variety of different ways. For instance, where the display screen on which display 190 is generated is a touch sensitive screen, the user input mechanisms can be actuated by touch gestures using the user's finger, a stylus, or another touch mechanism. Similarly, the mechanisms can be actuated by a point and click device (such as a mouse or track ball) by a keyboard (either a hardware keyboard or a soft keyboard) by a key pad, by voice inputs, or by other user input devices. Those listed are for the sake of example only.

Figure 4:
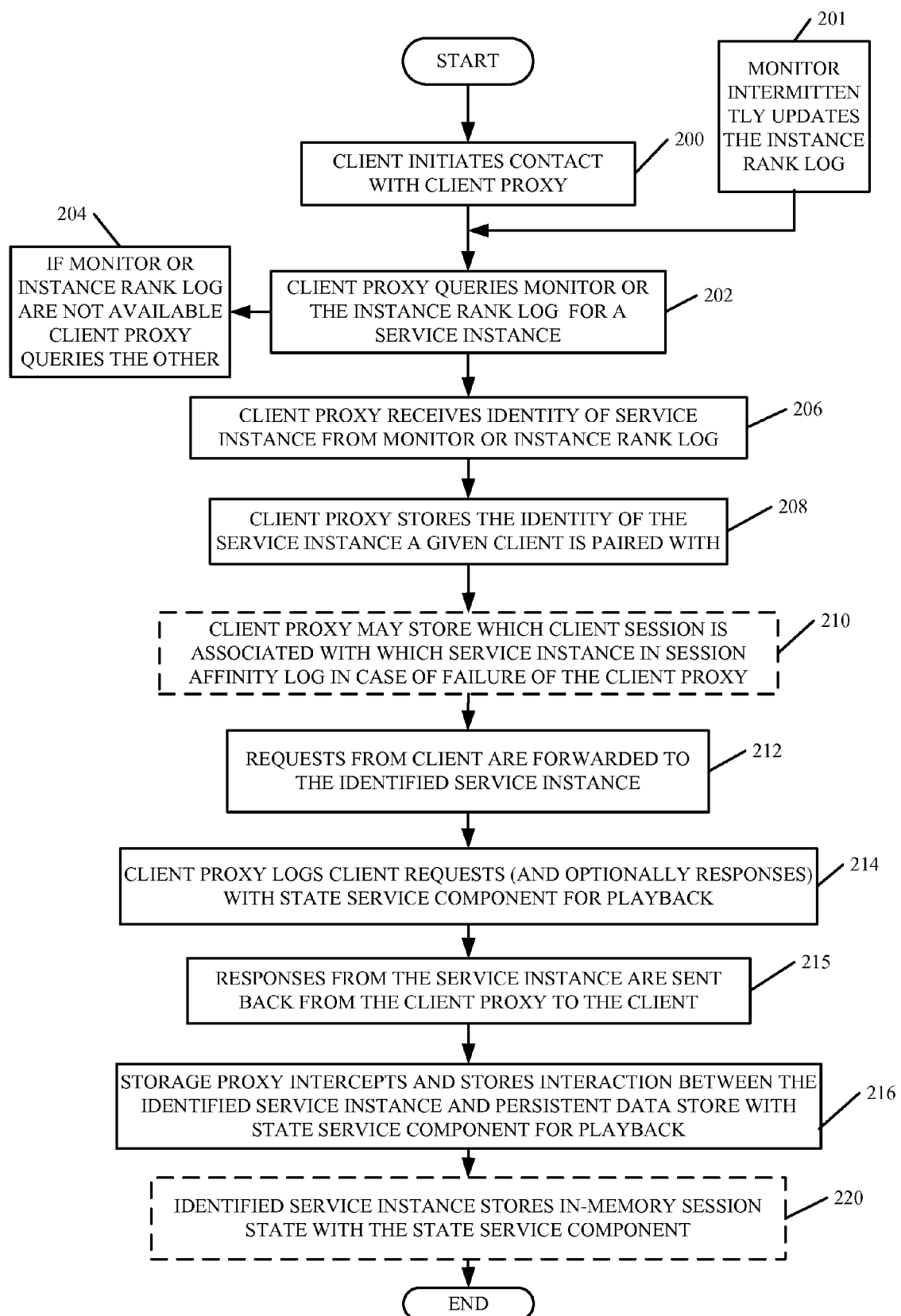
FIG. 4 is a flow diagram illustrating one embodiment of the operation of the system shown in FIG. 1 in performing state preservation for a stateful service.

FIG. 4 illustrates the operation of system 100 in performing state preservation for service 106. Client 102 first initiates contact with client proxy 116 to gain access to service 106. This is indicated by block 200 in FIG. 4. It will also be noted that monitor component 122 is monitoring performance of the service instances and ranks them in terms of which instances are performing better than others. Monitor component 122 also intermittently records the ranking in instance ranking log 126. This is indicated by block 201 in FIG. 4.

In response, in one embodiment of system 100, upon the client 102 initiating contact with client proxy 116, client proxy 116 queries monitor component 122 to obtain the identity of a specific service instance 108-110 that client proxy 116 should use. Alternatively, client proxy 116 can simply read the instance ranking from log 126 to obtain the identity of the best service instance to service a client request. This is indicated by block 202 in FIG. 4.

Before proceeding with the present discussion, it should be noted that system 100 includes redundancy in case monitor component 122 or the instance rank log 126 becomes inoperational for any reason. Monitor component 122 periodically logs a ranking of the available service instances in an instance rank log 126. Therefore, should monitor component 122 be inoperational, client proxy 116 can simply access instance rank log 126 to identify the most suitable service instance as last ranked by monitor component 122. It may be likely that that particular service instance is still the most suitable service instance. In an alternate embodiment of the system 100, the client proxy 116 always queries the instance rank log 126 directly. Further, if the instance rank log 126 becomes unavailable, then client proxy 116 can query monitor component 124 for the best service instance. The step of accessing the instance rank log 126 or monitor component 124 in the event of some type of failure is indicated by block 204 in FIG. 4.

Receiving at client proxy 116, the identity of the most suitable service instance (either from monitor component 122 or instance rank log 126) is indicated by block 206 in FIG. 4.

Client proxy 116 also illustratively stores, itself, the identity of the service instance it has paired a given client with. This is indicated by block 208. That is, there can be a many-to-one relation between clients (i.e. client sessions) and client proxy 116. There can be a one-to-one relation between the client (i.e. client session) and a service instance. Client proxy 116 can store a mapping between different clients (i.e. distinct client sessions) it has paired to available service instances. Therefore, when subsequent client requests are received for a given session, client proxy 116 uses the same service instance for the given session.

Client proxy 116 can also optionally store a mapping that shows which client session is associated with which service instance in affinity log 127. In that case, if client proxy 116 fails (or if another proxy wishes to service client 102 for any other reason), the other client proxy that begins conducting the session can access affinity log 127 and continue sending client requests for the given session to the same service instance that was being used by client proxy 116. This is indicated by block 210 in FIG. 4.

In order to determine which specific service instance 108-110 is the most suitable, monitor component 122 illustratively relies, at least in part, on performance parameters (counters) 130. Therefore, the fact that client proxy 116 queries the monitor component 122 or the instance rank log 126 to identify the most suitable service instance for client requests received by client proxy 116 means that client proxy 116 acts as a load balancing router for routing client requests to the most suitable service instance at any given time. By way of example, the most suitable service instance may have the least CPU usage and the most available memory. Table 2 illustrates pseudo code for an algorithm where CPU usage and available memory are the two performance parameters 130 that are considered by monitor component 122.

TABLE 2

Calculate Performance Counters

CounterTypes = {IdleProcessorTime; AvailableMemory}
for all countertype ∈ CounterTypes do
    CounterValues = ø
    for all counter ∈ PerformanceCounters do
        if counter[CounterType] = counterType then TABLE 2-continued Calculate Performance Counters

```
        CounterValues = CounterValues ∪ counter
            end if
        end for
        RankOnCurrentValue(CounterValues)
        for all c ∈ CounterValues do
            Update(PerformanceCounter, c)
        end for
    end for
```

It can be seen that the service instances are ranked based on those performance parameters and the query set out in Table 3 returns a particular service instance with the lowest rank value for all the performance parameters of interest. One embodiment of a specific algorithm for ranking the service instances is indicated below in Table 3.

TABLE 3

Rank Service Instances

```
SELECT TOP 1 Instance, MAX(RANK) AS Ranking
FROM InstanceRankLog
WHERE Component = ParamComponentType
GROUP BY Instance
ORDER BY Ranking ASC
```

In any case, once the most suitable service instance has been identified to client proxy 116, client proxy 116 sends requests from client 102 to the identified service instance. This is indicated by block 212 in FIG. 4.

After having received a response for the forwarded request, client proxy 116 logs the client requests and optionally the service response in the state data store 114 using state service component 112. This is done so that these requests can be played back to a new service instance, should the current service instance fail or be retired. After having logged the request and response pair, the client proxy 116 relays the service response to client 102. Logging the client requests with state service component 112 is indicated by block 214 in FIG. 4 and relaying the response back to client 102 is indicated by client 215. This preserves the session state for the current session as a message log of the request/response interaction between client 102 and the service instance of service 106. One embodiment for logging the session interactions is indicated in Table 4 below.

TABLE 4

Log Session Interactions

```
loop
    Request ← Read
    Server = ø
    Client ← GetClientIdentifier(Request)
    Server ← PreserveAffinity(Client)
    if Server = Ø then
        Server ← EstablishAffinity(Client)
    end if
    LogRequest(Request;Client)
    Response ← RelayRequest(Request; Server)
    LogResponse(Response;Client)
end loop
```

Storage proxy 118 intercepts and stores interaction between the identified service instance and the persistent data store 120 in the state data store 114 using state service component 112. This is indicated by block 216 in FIG. 4. This is done so that, should the current service instance fail or be retired, storage proxy 118 can replay this interaction to the new service instance so that no database requests to data store 120 are duplicated from the previous instance.

It will be noted that the current service instance that is being used can also store in-memory session state information with the state service component 112. Therefore, not only can proxies 116 and 118 store logs in state service component 112, but the service instance currently being used can do that as well. This is indicated by block 220, and that block is shown in phantom, because it is optional.

Figure 5:
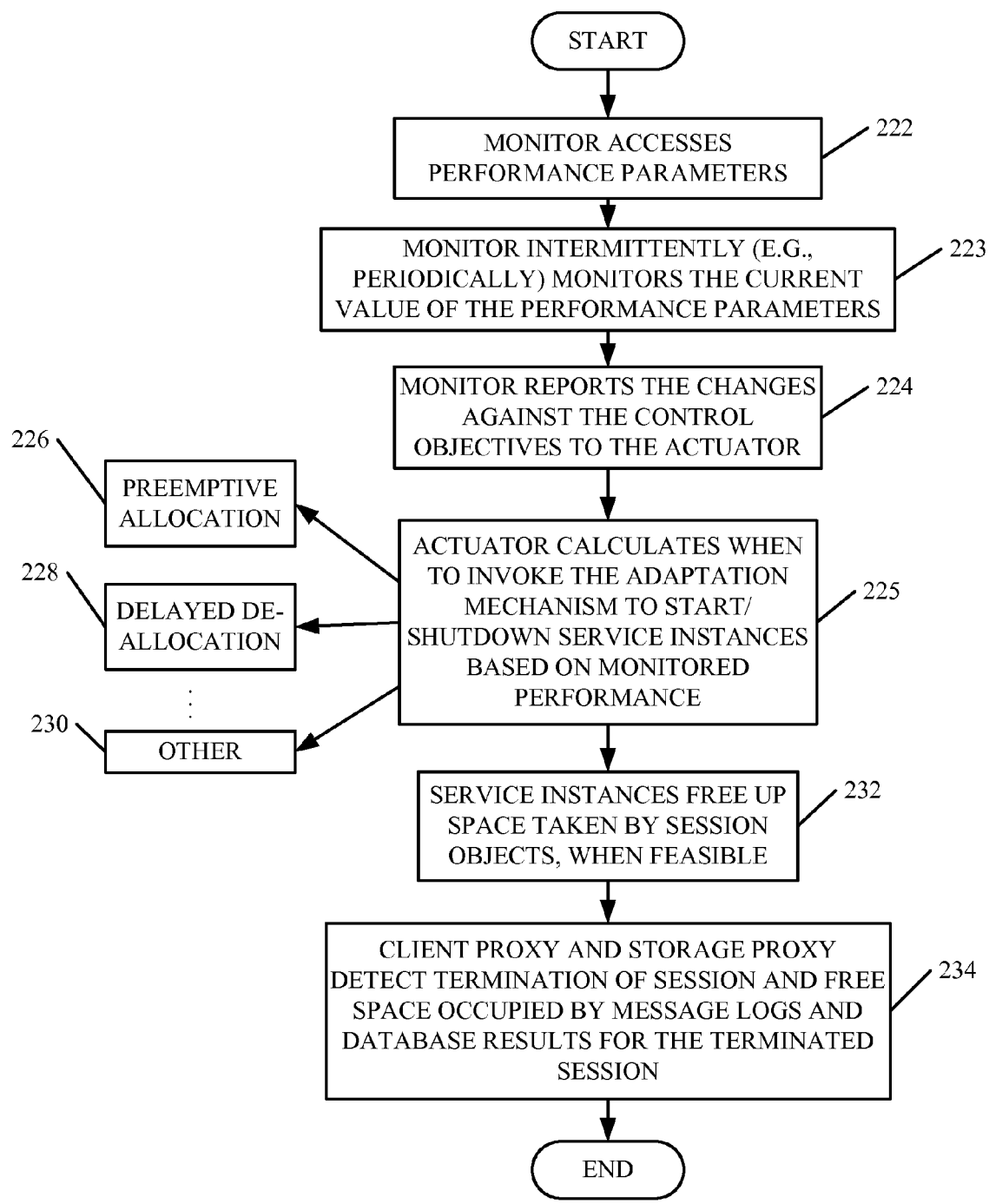
FIG. 5 is a flow diagram illustrating one embodiment of the operation of the system shown in FIG. 1 in allocating and de-allocating (or retiring) service instances and sessions.

FIG. 5 is a flow diagram illustrating one embodiment of the operation of the system shown in FIG. 1 in allocating and de-allocating (or retiring) service instances and sessions between client 102 and service 106. Monitor component 122 accesses performance parameters 130. This is indicated by block 222 in FIG. 5. Monitor component 122 then monitors the performance of service 106, and the various instances 108-110, based on the performance parameters as compared against the threshold values or control objectives. This is indicated by block 223 in FIG. 5. Monitor component 122 then reports the changes in the measured performance parameters against the control objectives (or a forecast based on those values) to actuator component 124. This is indicated by block 224 in FIG. 5. Based on the report from monitor component 122, actuator component 124 calculates when to invoke adaptation mechanism 125 to start or retire service instances. This is indicated by block 225 in FIG. 5. It will be noted that, as discussed above, actuator component 124 via adaptation mechanism 125 can preempt allocation of resources and delay the retirement of new resources, or act in other ways as well. This is indicated by blocks 226, 228 and 230, respectively.

In one embodiment, as discussed above, resource acquisition is preempted and only enacted after receiving a sufficient number of demands for any resource type (such as processor or memory). Resource release (or retirement) can be delayed and actuated only when necessary scale down signals have been accumulated for all resource types. This helps to ensure prompt scaling up and eventual scaling down in a gradual fashion (such as one instance at a time).

Table 5 shows one example of an algorithm for provisioning (or allocating) resources to achieve timely elasticity in the system.

TABLE 5

Provision Resources

```
CounterTypes = {IdleProcessorTime; AvailableMemory}
for all counterType ∈ CounterTypes do
    SumForCounter ← 0
    TotalChangeInCounter ← 0
    PredictionForCounter ← 0
    NumberOfInstances ← 0
    for all counter ∈ PerformanceCounters do
        if counter[CounterType] = counterType then
            SumOfCounter = SumOfCounter + counter[CurrentValue]
            TotalChangeInCounter = TotalChangeInCounter +
            (counter[CurrentValue] − counter[OldValue])
            NumberOfInstances = NumberOfInstances +1
        end if
    end for
    PredictionForCounter = (SumForCounter +
    TotalChangeInCounter)/NumberOfInstances
    Signal : {CounterType; Scale; Strength}
    if PredictionF orCounter > UpperBoundSLO[counterType] then
        Signal ← {counterType;Down; PredictionF orCounter−
        UpperBoundSLO[counterType]}
    end if
    if PredictionForCounter < LowerBoundSLO[counterType] then
        Signal ← {counterType;Up; LowerBoundSLO[counterType]−
```

TABLE 5-continued

Provision Resources

```
        PredictionForCounter}
    end if
    Send(Signal)
end for
```

It can be seen that the algorithm in Table 5 is a rate-based calculation. It calculates the sum of current performance counter values and the difference between current and old values of a performance counter, computed over all instances. The averaged sum of these two values is set as a demand forecast (or prediction). Resource adjustments may happen when the monitor component 122 performs this calculation. For instance, monitor component 122 can ask for resource adjustments if the forecast reaches a desired value (such as one set by a control objective). The value can be set as a value range with known upper and lower bounds whose width is defined by an applicable service level objective. The nature of the elasticity signal sent to actuator component 124 (e.g., either allocate a resource or retire one) is determined by the particular upper or lower bound that has been violated. Table 5 shows the algorithm for the available memory and processor time counter types.

Actuator component 124 waits to receive an elasticity signal from monitor component 122 to either add an instance (or resource) or release (or retire) an instance (or resource). Table 6 shows one algorithm for doing that.

TABLE 6

Actuate Elasticity

```
Signal : {CounterType; Scale; Strength]
loop
        Signal ← Read
        if Signal[Scale] = Up then
            Acquire(Signal[Strength])
        end if
        if Signal[Scale] = Down then
            Release(Signal[Strength])
        end if
end loop
```

Both the action of acquiring a resource and releasing a resource are accumulative. Therefore, resources are acquired or released only after sufficient invocations from monitor component 122 that would amount to the minimum unit of a given resource type. As discussed above, resource acquisition can be preempted and enacted for sufficient demand for any resource type (such as processor or memory resources), and resource release can be delayed and actuated when the necessary scale down signals have been accumulated for all resource types.

It will be noted that service instances 108-110, themselves, can also free up space taken by session objects, when feasible. This step is indicated by block 232 in FIG. 5.

In addition, client proxy 116 can detect termination of a session and free space occupied by the message logs stored by client proxy 116 in state service component 112. Storage proxy 118 can also be notified of the termination of a session by the client proxy 116 and free space occupied by database results for the terminated session. This is indicated by block 234 in FIG. 5.

It will be noted that message logs can optionally be kept or even archived long after the associated session has terminated. This can be done for use in debugging or for other purposes.

Figure 6:
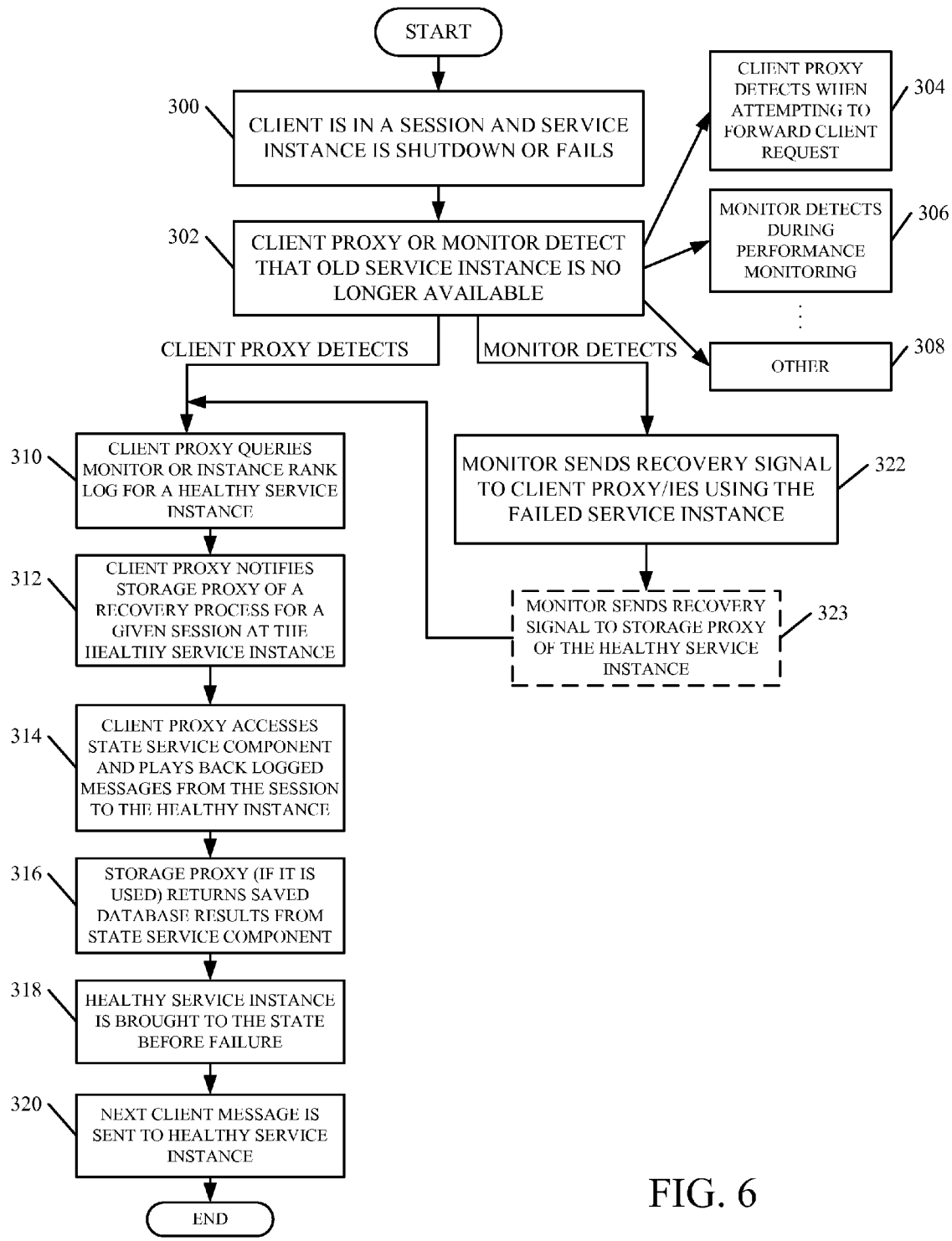
FIG. 6 is a flow diagram illustrating one embodiment of the operation of the system shown in FIG. 1 in restoring state for a session.

FIG. 6 is a flow diagram illustrating one embodiment of the operation of the system shown in FIG. 1 in recovering a session. As described above, this may happen where a given service instance 108-110 fails, or where actuator component 124 releases a given service instance and the session must be migrated to a new service instance. It is first assumed that client 102 is in a session with one of service instances 108-110 (such as service instance 108). Then, the service instance 108 fails or is shutdown by actuator component 124. This is indicated by block 300 in FIG. 6. This can happen for a variety of different reasons. For instance, service instance 108 may be retired by actuator component 124, because the workload of the various clients on service 106 does not require it. In another embodiment, service instance 108 can fail for some other reason. It may also be that service instance 108 becomes too busy so actuator component 124 launches another service instance 110 and subsequent requests from client 102 are routed to service instance 110 by client proxy 116.

In any case, either client proxy 116 or monitor component 122 detects that the old service instance 108 is no longer available. This is indicated by block 302 in FIG. 6 and this can happen in a variety of ways as well. For instance, when client proxy 116 attempts to forward a message or request to service instance 108, client proxy 116 can detect at that point that service instance 108 is no longer available. This is indicated by block 304. Further, monitor component 122 can detect this during performance monitoring. This is indicated by block 306 in FIG. 6. Of course, there are other ways of detecting that the service instance 108 is no longer available, and this is indicated by block 308 in FIG. 6.

In the event that client proxy 116 detects that service instance 108 is no longer available, client proxy 116 queries monitor component 122 or instance rank log 126 for a healthy service instance. This is indicated by block 310 in FIG. 6. Monitor component 122, or instance rank log 126, then illustratively identifies a healthy service instance (and the most suitable one based on the monitored performance) and client proxy 116, in turn, notifies storage proxy 118 of a recovery process at the newly identified healthy service instance (e.g., service instance 110). This is indicated by block 312 in FIG. 6. Client proxy 116 accesses state service component 112 and plays logged messages from the session to the healthy service instance 110. This is indicated by block 314. Storage proxy 118 (if it is being used in the session) returns saved database results from the state service component 112, to the new service instance 110. This is indicated by block 316 in FIG. 6. This places the healthy service instance 110 into the state that service instance 108 was in, before it became unavailable. This is indicated by block 318 in FIG. 6.

Once service instance 110 is in the proper state, client proxy 116 forwards the client message (or request) to the healthy service instance 110. This is indicated by block 320.

Table 7 shows one example of an algorithm that is indicative of the recovery steps involved.

TABLE 7

Recover Client Session

```
loop
    FailedServiceInstance ←Read
    OrphanClients ←RetrieveAffinity(FailedServiceInstance)
    for all Client ∈ OrphanClients do
        Requests = RetrieveSessionLogInTimeOrder(Client)
        SignalRecovery(StorageP roxy; Client)
        HealthyServiceInstance ← GetBestServiceInstance(Monitor)
        EstablishAffinity(Client;HealthyServiceInstance)
        RemoveAffinity(Client; FailedServiceInstance)
```

TABLE 7-continued

Recover Client Session

```
        for all Request ∈ Requests do
            RelayRequest(Request;HealthyServiceInstance)
        end for
    end for
end loop
```

The algorithm shown in TABLE 7 retrieves the session log for the current session, obtains a healthy service instance from monitor component 122, establishes session affinity with the healthy service instance and relays the current request to the healthy service instance. A similar algorithm applies to the storage proxy 118.

If, instead of client proxy 116, monitor component 122 detects that the old service instance 108 is no longer available, processing proceeds from block 302 in FIG. 6 to block 322. Monitor component 122 sends a recovery signal to all client proxies (such as client proxy 116) using the failed service instance 108. This is indicated by block 322 in FIG. 6. In one embodiment, monitor component 122 also sends the recovery signal to storage proxy 118 of the healthy service instance. This is optional and is indicated by block 323 in FIG. 6. In another embodiment of system 100, the monitor component 122 only sends a recovery signal to client proxy 116 which, itself, later forwards the signal to storage proxy 118. Once this has been done, processing proceeds with respect to blocks 310-320 discussed above.

Figure 7:
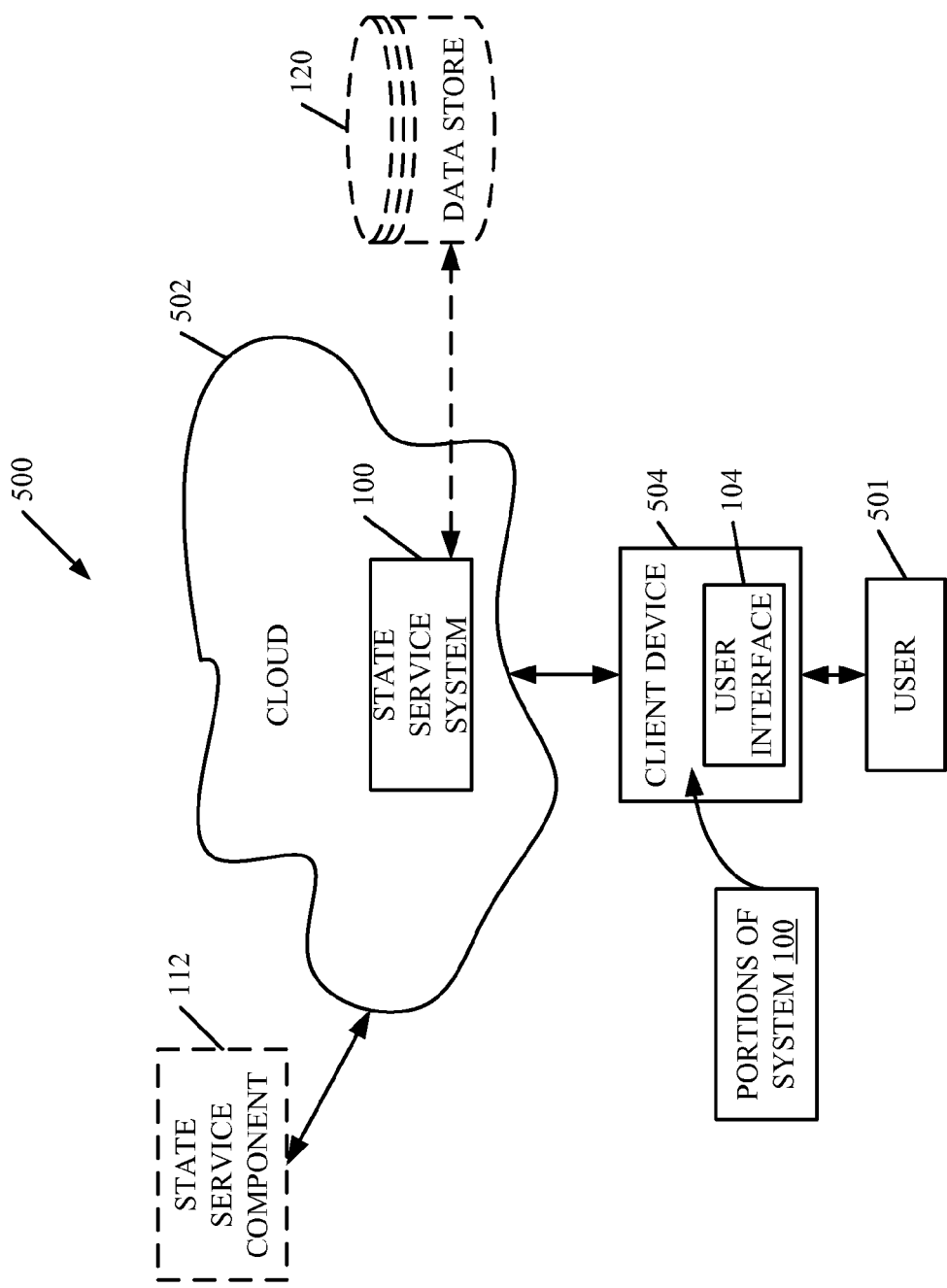
FIG. 7 is a block diagram of various architectures in which the system shown in FIG. 1 can be deployed.

FIG. 7 is a block diagram of system 100, shown in various architectures, including cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

The embodiment shown in FIG. 7, specifically shows that system 100 is located in cloud 502 (which can be public, private, or a combination where portions are public while others are private). Therefore, user 501 uses a client device 504 to access those systems through cloud 502. Client device 504 can correspond to client 102 shown in FIG. 1, or another client.

FIG. 7 also depicts another embodiment of a cloud architecture. FIG. 7 shows that it is also contemplated that some elements of system 100 are disposed in cloud 502 while others are not. By way of example, data store 120 can be disposed outside of cloud 502, and accessed through cloud 502. In another embodiment, some or all of the components of system 100 are also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 7 further shows that some of the portions of system 100 can be located on device 504. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
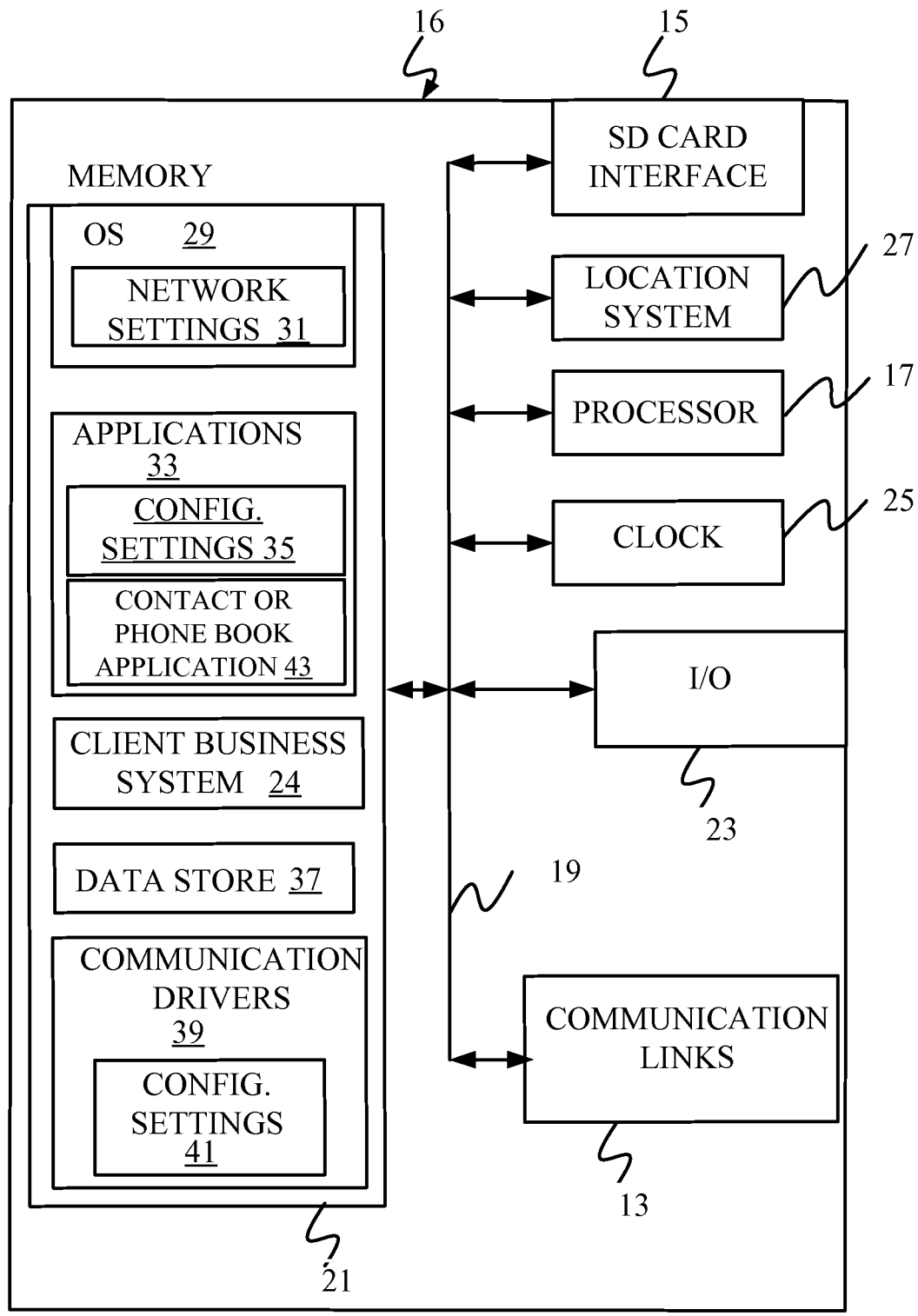
FIGS. 8-11 illustrate various embodiments of mobile devices.
Figure 9:
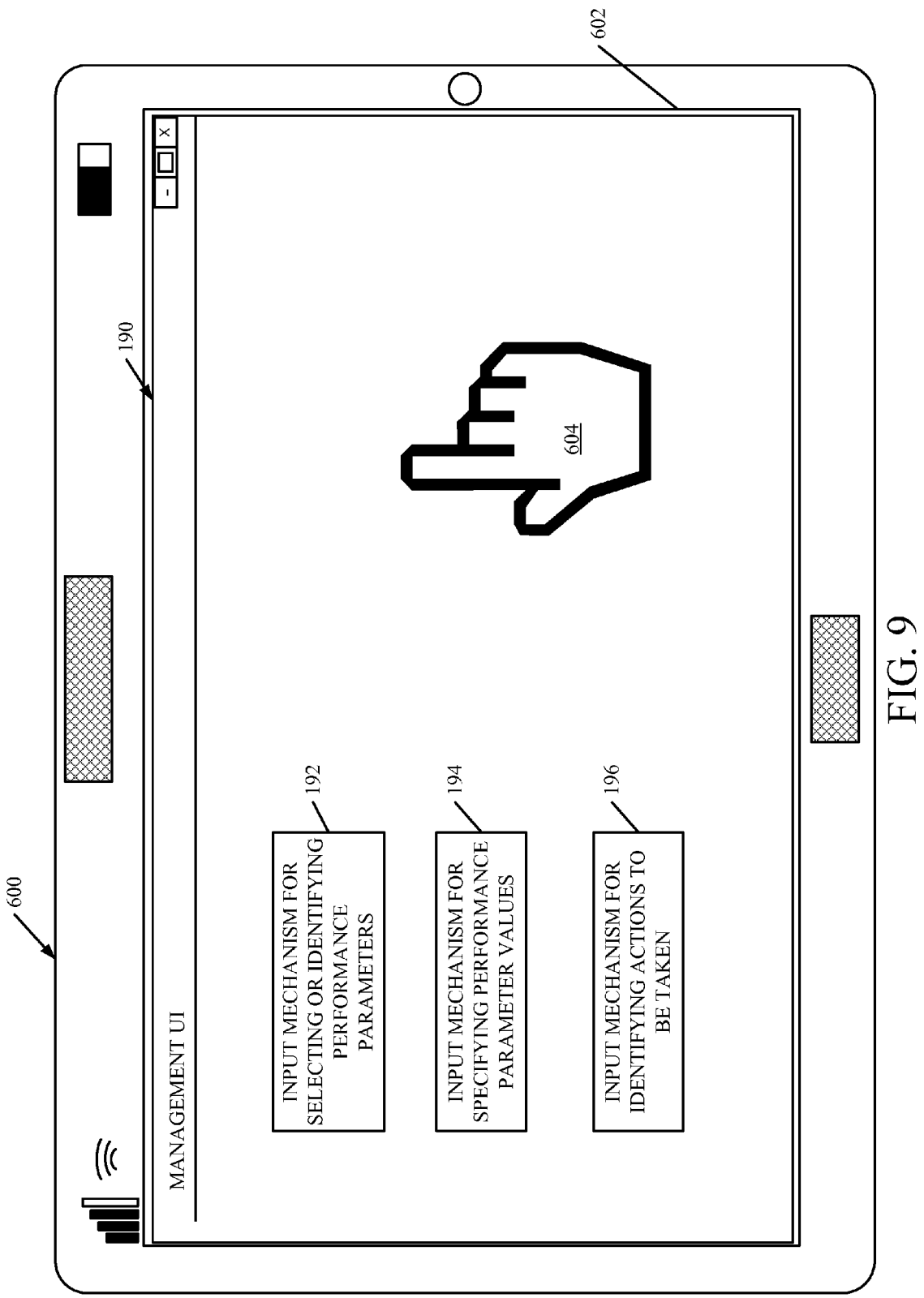
Figure 10:
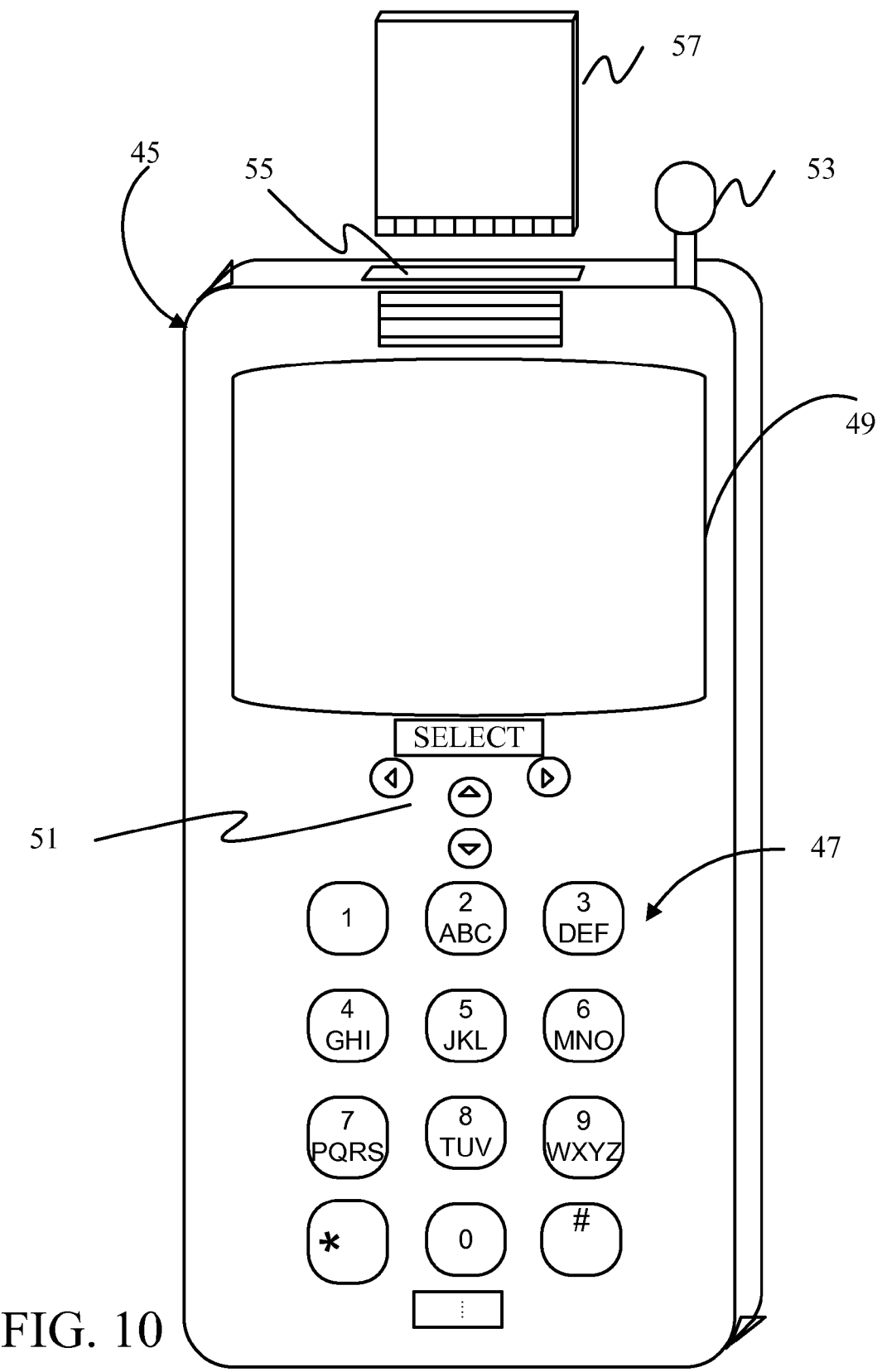

FIG. 8 is a simplified block diagram of one illustrative embodiment of a handheld or mobile computing device that can be used as a user's or client's hand held device 16, (which can be client 102 in FIG. 1 or another client) in which parts of the present system can be deployed. FIGS. 8-10 are examples of handheld or mobile devices.

FIG. 8 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processors 128 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 120 or data store 114, for example, can reside in memory 21. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 11:
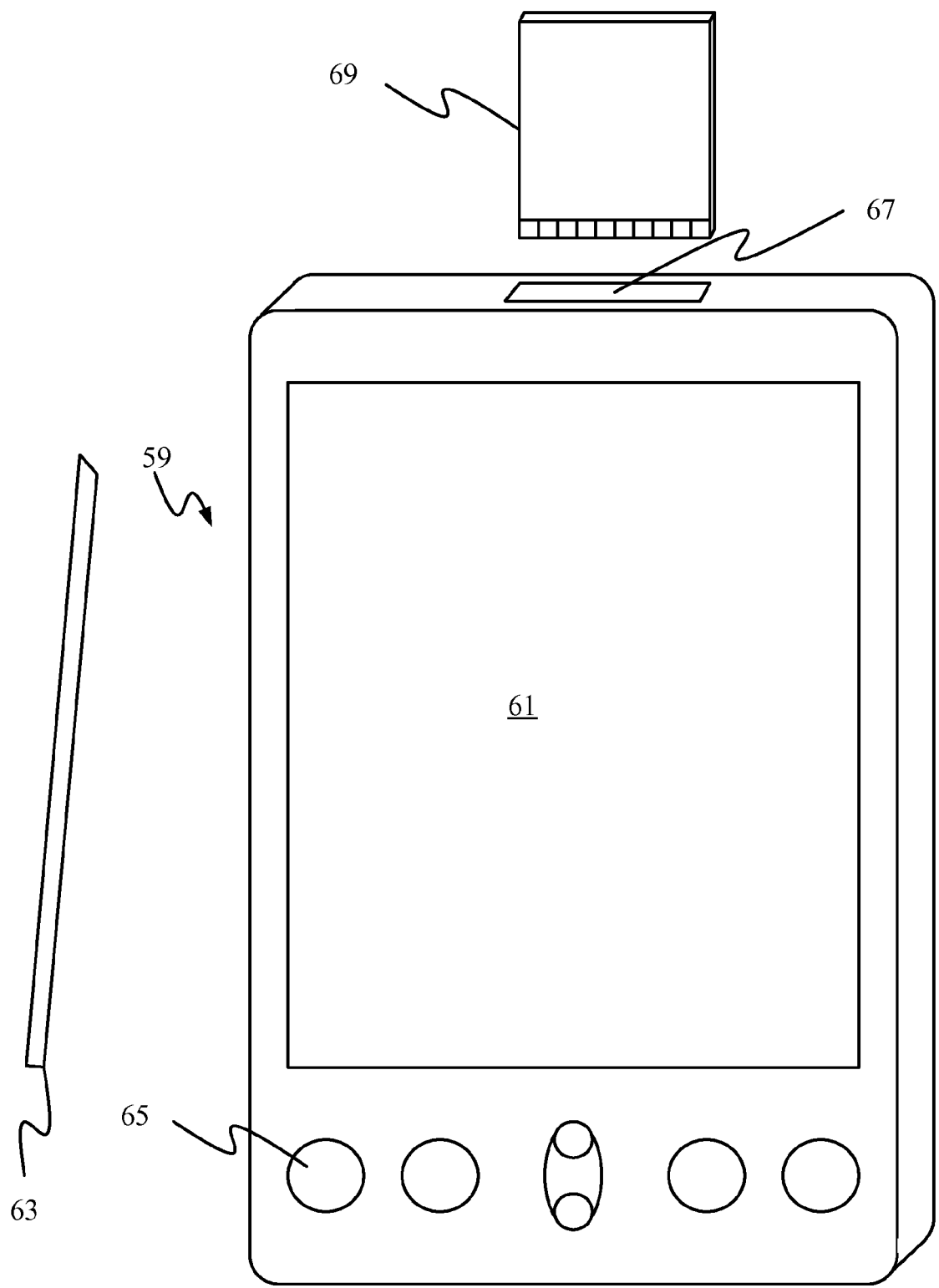

FIGS. 10 and 11 provide additional examples of devices 16 that can be used, although others can be used as well. In FIG. 10, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 12:
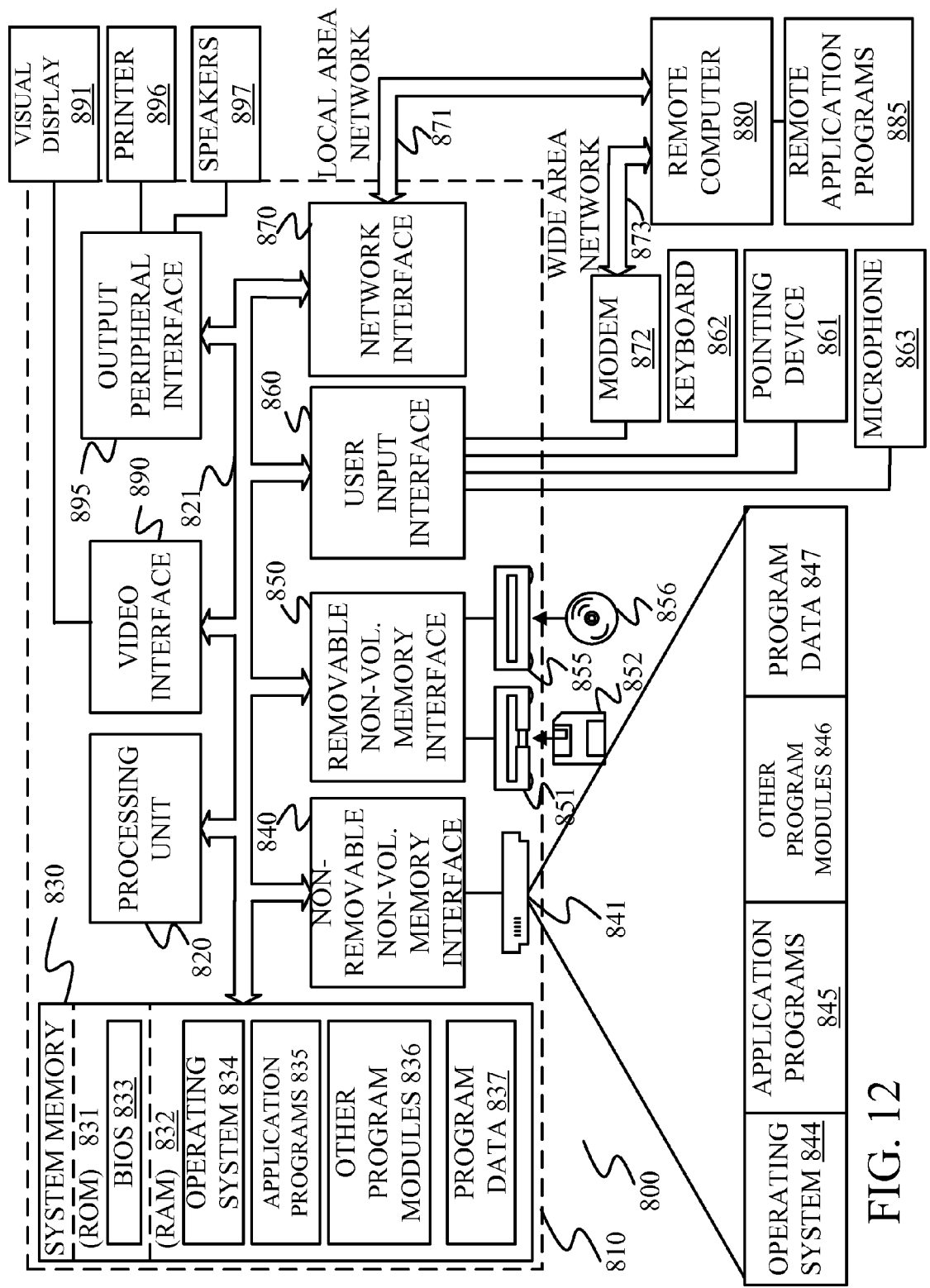
FIG. 12 is a block diagram of one embodiment of a computing environment.

FIG. 12 is one embodiment of a computing environment in which system 100 (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 128), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1-11 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing a state service to a client of the service, comprising:
   receiving an interface definition for the service;
   generating a client proxy based on the interface definition, the client proxy being deployed between the service and the client;
   receiving a service request from the client at the client proxy, during a session between the client and the service, the client proxy providing the service request to the service and storing the service request with a state service; and
   restoring session state using the state service, wherein restoring comprises playing back stored service requests stored with the state service for the session by the client proxy.

2. The computer-implemented method of claim 1 and further comprising:
   after receiving the service request, obtaining a service instance identifier of a first service instance to use in servicing the service request.

3. The computer-implemented method of claim 2 wherein providing the service request to the service comprises:
   sending the service request from the client proxy to the first service instance; and
   the client proxy sending responses from the first service instance to the client.

4. The computer implemented method of claim 3 and further comprising:
   storing a pairing of the client and the first service instance for a current session between the client and the first service instance.

5. The computer-implemented method of claim 2 and further comprising:
   determining that the first service instance is unavailable; and
   obtaining a service instance identifier for a second service instance.

6. The computer-implemented method of claim 5, wherein restoring the session state comprises:
   restoring the session state to the second service instance using the state service.

7. The computer-implemented method of claim 6 wherein playing back stored service requests comprises:
   playing back, to the second service instance, all stored service requests stored with the state service for the session by the client proxy.

8. The computer-implemented method of claim 7 and further comprising:
   generating a storage proxy for the service, the storage proxy being deployed between the service and a data store; and
   receiving a data store interaction, from the service, at the storage proxy, the storage proxy storing the interaction between the service and the data store, in the state service.

9. The computer-implemented method of claim 8 wherein restoring session state comprises:
   playing back, to the second service instance, the data storage interactions stored by the storage proxy with the state service.

10. The computer-implemented method of claim 6 and further comprising:
    after restoring session state to the second service instance, sending the service request to the second service instance; and
    updating the existing pairing of the client from the first service instance to the second service instance for the session between the client and the second service instance.

11. The computer-implemented method of claim 2 and further comprising:
    generating a performance parameter user interface display; and
    receiving performance parameters to be monitored.

12. The computer-implemented method of claim 11 wherein obtaining the service instance identifier for the first service instance comprises:
    monitoring performance of a plurality of service instances based on the performance parameters; and
    selecting the first service instance to receive the service request from the client proxy based on the monitored performance.

13. The computer-implemented method of claim 12 and further comprising:
    generating an actions user interface display; and
    receiving action indicators indicative of actions to be performed based on control objectives.

14. The computer-implemented method of claim 13 and further comprising:
    receiving the control objectives in terms of values or ranges of the performance parameters; and
    allocating and de-allocating service instances based on the control objectives.

15. The computer-implemented method of claim 14 wherein receiving action indicators comprises at least one of:
    receiving an allocation preemption indicator, and further comprising:
      pre-empting allocation of service instances based on the allocation preemption indicator; and
    receiving an allocation deferment indicator; and further comprising:
      postponing allocation of service instances based on the allocation deferment indicator.

16. The computer-implemented method of claim 15 wherein receiving action indicators comprises at least one of:
    receiving a delayed de-allocation indicator, and further comprising:
      delaying de-allocation of service instances based on the delayed de-allocation indicator; and
    receiving a de-allocation deferment indicator; and further comprising:
      postponing de-allocation of service instances based on the de-allocation deferment indicator.

17. The computer-implemented method of claim 16 and further comprising:
    exposing an application programming interface (API) with methods to receive user inputs setting for at least one of performance parameters selection, control objectives, preemption and delayed de-allocation characteristics, and performance monitoring sensitivity.

18. The computer-implemented method of claim 12 wherein obtaining a service instance identifier comprises:
    ranking the service instance based on performance to obtain service instance ranking; and
    storing the service instance ranking for access by the client proxy.

19. A state service system, comprising:
    a hosted service implementing a plurality of service instances;
    a client proxy receiving service requests from a client, during a session between the client and the hosted service, and providing them to a first service instance of the hosted service;
    a storage proxy receiving database interaction requests from the first service instance of the hosted service, for the session, and providing them to a database;
    a state service that stores the service requests and the database interaction requests for the session, in response to switching service instance of the session from the first service instance to a second service instance, the client proxy replaying at least the service requests, stored in the state service for the session, to the second service instance and the storage proxy replaying at least the database interaction responses, stored in the state service for the session, to the second service instance; and
    a computer processor being a functional part of the system and activated by the client proxy and the storage proxy to facilitate storing the service requests and the database interaction requests in the state service.

20. A computer readable storage device that stores computer readable instructions which, when executed by a computer, cause the computer to perform steps comprising:
    receiving an interface definition for the service;
    generating a client proxy based on the interface definition, the client proxy being deployed between the service and the client;
    receiving a service request from the client at the client proxy, during a session between the client and the service, the client proxy logging the service request with a state service; generating a storage proxy for the client, the storage proxy being deployed between the service and a data store; receiving a data store interaction, from the service, at the storage proxy, the storage proxy logging the interaction between the service and the data store, in the state service; after receiving the service request, receiving a service instance identifier of a first service instance to use in servicing the service request;
    sending the service request from the client proxy to the first service instance;
    determining that the first service instance is unavailable;

receiving a service instance identifier a second service instance;

restoring state to the second service instance using the state service by playing back, to the second service instance, all logged service requests sent to the state service for the session and back, to the second service the data storage interactions sent by the storage proxy to the state service; and after restoring state to the second service instance, sending the service request to the second service instance.

* * * * *